United States Patent
Nelson

(10) Patent No.: US 8,770,314 B2
(45) Date of Patent: Jul. 8, 2014

(54) PNEUMATIC MOTOR UNIT WITH INTEGRATED VOLTAGE GENERATING MEANS

(75) Inventor: Anders Urban Nelson, Älvsjö (SE)

(73) Assignee: Atlas Copco Industrial Technique Aktiebolag, Stockholm (SE)

( * ) Notice: Subject to any disclaimer, the term of this patent is extended or adjusted under 35 U.S.C. 154(b) by 483 days.

(21) Appl. No.: 13/260,625

(22) PCT Filed: Mar. 26, 2010

(86) PCT No.: PCT/SE2010/000075
§ 371 (c)(1),
(2), (4) Date: Nov. 1, 2011

(87) PCT Pub. No.: WO2010/110717
PCT Pub. Date: Sep. 30, 2010

(65) Prior Publication Data
US 2012/0039736 A1   Feb. 16, 2012

(30) Foreign Application Priority Data
Mar. 27, 2009  (SE) ...................................... 0900392

(51) Int. Cl.
*B23Q 5/08*  (2006.01)
(52) U.S. Cl.
USPC ............... 173/176; 310/339; 227/2; 173/5
(58) Field of Classification Search
CPC ............ B25C 1/08; F04C 15/00; H02N 2/18; B23Q 5/06
USPC ........ 227/9, 10, 130; 173/176, 1–6, 178–183, 173/93, 93.5, 168; 310/339
See application file for complete search history.

(56) References Cited

U.S. PATENT DOCUMENTS

| | | | |
|---|---|---|---|
| 4,075,850 A * | 2/1978 | Nakazato et al. | 60/633 |
| 4,773,581 A * | 9/1988 | Ohtsu et al. | 227/10 |
| 6,260,519 B1 * | 7/2001 | Phillips | 123/46 R |

(Continued)

FOREIGN PATENT DOCUMENTS

WO    WO 2008/124762 A1    10/2008

OTHER PUBLICATIONS

International Search Report dated Jun. 28, 2010 issued in International Appln. No. PCT/SE2010/000075.

*Primary Examiner* — Thanh Truong
*Assistant Examiner* — Tara M Ho
(74) *Attorney, Agent, or Firm* — Holtz Holtz Goodman & Chick PC

(57) ABSTRACT

A pneumatic motor unit includes a housing with an air inlet passage, an exhaust air outlet passage, and a rotation motor which generates a pulsating exhaust air outlet flow. The motor unit further includes a voltage depending device which communicates signals in response to at least one of an actual motor condition and operation parameter values, and a voltage generating section which is connected to the voltage depending device and which includes a piezoelectric element provided in the exhaust air outlet passage and arranged to be activated by pressure pulses of the pulsating exhaust air outlet flow from the motor. The piezoelectric element is tongue shaped and rigidly secured at one end, and is arranged to be swung in a two-way movement relative to a central rest position to thereby generate an alternating current voltage.

8 Claims, 2 Drawing Sheets

(56) References Cited

U.S. PATENT DOCUMENTS

| | | |
|---|---|---|
| 6,984,902 B1 | 1/2006 | Huang et al. |
| 7,461,766 B2 * | 12/2008 | Miyata et al. .................. 227/10 |
| 2008/0011251 A1 * | 1/2008 | Tanaka ..................... 123/46 SC |
| 2008/0252446 A1 | 10/2008 | Dammertz |

* cited by examiner

PNEUMATIC MOTOR UNIT WITH INTEGRATED VOLTAGE GENERATING MEANS

CROSS-REFERENCE TO RELATED APPLICATIONS

This application is a U.S. National Phase Application under 35 USC 371 of International Application PCT/SE2010/000075 filed Mar. 26, 2010.

BACKGROUND OF THE INVENTION

1. Field of the Invention

The invention relates to a pneumatic motor unit having an integrated voltage generator. In particular, the invention concerns a pneumatic motor unit wherein the motor has a pulsating exhaust air outlet flow, for example a vane motor.

2. Description of Related Art

Pneumatic motor units of the above mentioned type are predominant in pneumatic power tools like power wrenches, grinders etc. but are frequently used also in process industry. In many applications there is a demand for obtaining accurate and precise information of the motor operation and/or the actual status of the motor unit. Preferably, this is accomplished by using electrically actuated operation monitoring means for obtaining data of the motor speed, the power shut off etc. and/or means for indicating accumulated operation time, motor temperature etc. Such operation and status monitoring means is dependent on signals from signal emitting sensors on the motor unit. Using sensors of this type is no problem in electrically powered tools where electric power is always accessible, but using sensors and transferring data in pneumatic motor units is not possible unless there is especially provided electric voltage, either via a cable connection with an external electric power source or by providing a voltage generating means integrated in the motor unit itself.

In some applications it is not practical or suitable to use cables, routed separately or in connection with a pressure air conduit, for supplying electric power to the motor unit. This means that in such applications there has to be provided a voltage generating means integrated in the motor unit itself. Certain data related to motor unit operation parameters or to the status of the motor unit may be transferred to a remote system via a wireless communication equipment including a transceiver provided onboard the motor unit and powered by the integrated voltage generating means.

An alternative to supply electric power via a cable would be to provide the motor unit with an onboard battery. However, batteries are rather space demanding, and a battery of small enough dimensions would have a restricted service life and would do neither be able to provide peak currents of magnitudes required for powering sensors and/or wireless communication equipments.

An example on pneumatic motor units with an integrated voltage generating means is described in U.S. Pat. No. 6,840,723. This known motor unit forms a part of a milling tool spindle and comprises a pneumatic turbine, wherein the turbine rotor is provided with a permanent magnet arranged to cooperate with a stationary coil to form a voltage generating means. The magnitude of the voltage generated by this device is speed dependent and is used for activating a speed governing air inlet valve.

This prior art device is disadvantageous in that it requires a specific design of the rotor for attaching the magnet, and that the location of the coil is restricted to a well defined disposition relative to the motor rotor. This means that the design of the motor is very much dependent on the design of the voltage generating device. A further drawback of this known voltage generating device is the instability of the permanent magnet. Such magnets tend to loose power over time and as a result of impacts, which makes the operation and the output voltage less reliable. Magnets also attract and gather ferrous particles which tend to clog up the motor and impair the motor operation.

SUMMARY OF THE INVENTION

It is an object of the invention to provide a pneumatic motor unit which comprises a rotation motor with a pulsating exhaust air outlet flow and including a voltage generating means of a compact and durable design, wherein the location of the voltage generating means is not restricted to a specific disposition relative to the motor rotor.

Another object of the invention is to provide a pneumatic motor unit having an electric voltage generating means useful for detecting rotational movement of the motor rotor and to determine angular positions of the motor unit rotor, which in certain applications is of great importance.

Further objects and advantages of the invention will appear from the following specification and claims.

A preferred embodiment of the invention is described below in detail with reference to the accompanying drawing.

DETAILED DESCRIPTION OF A PREFERRED EMBODIMENT

Figure 1:
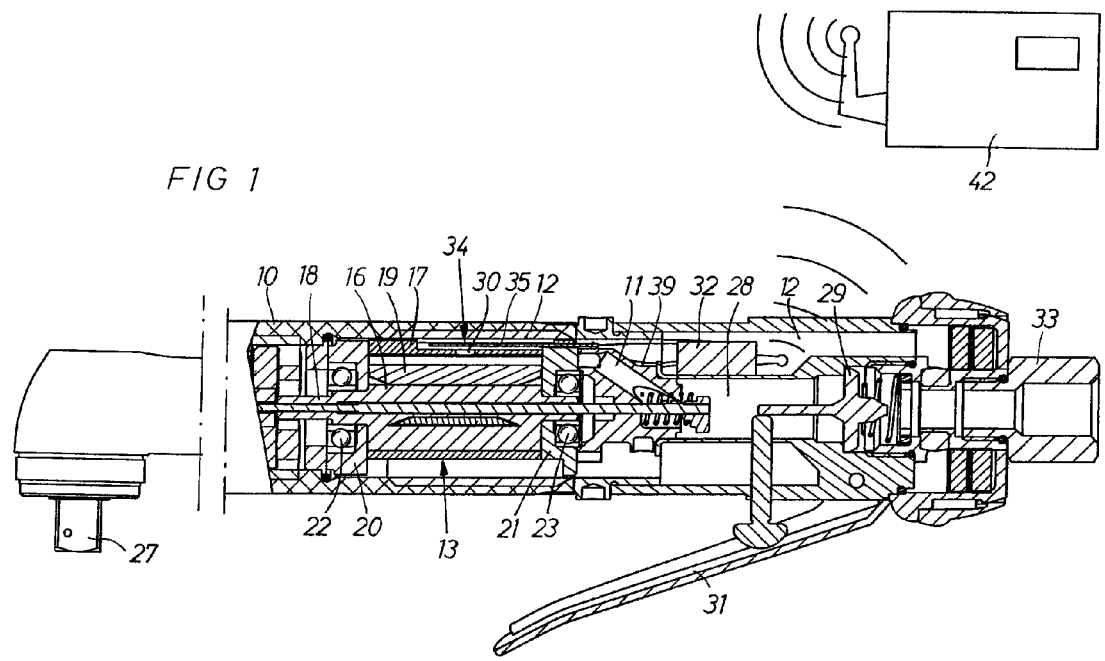
FIG. 1 shows a shortened side view, partly in section, of a power wrench comprising a motor unit according to the invention.
Figure 6:
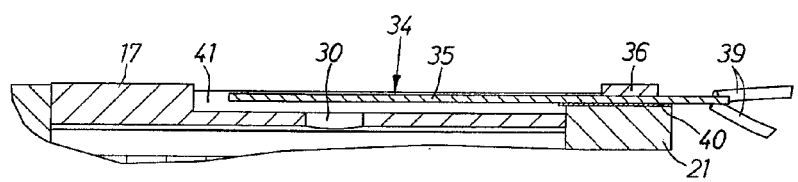
FIG. 6 shows on a larger scale a part section of the motor unit as illustrated in FIG. 3.

The motor unit illustrated in the drawing figures forms a part of a pneumatic angle type power wrench, wherein the power wrench housing constitutes the motor unit housing 10. The housing 10 comprises a pressure air inlet passage 11, an exhaust air outlet passage 12, and supports a pneumatic vane type rotation motor 13. The latter includes a rotor 16 and a cylinder 17, wherein the rotor 16 carries an output spindle 18 and four sliding vanes 19 for cooperation with the cylinder 17. The motor 13 further comprises a forward end wall 20 and a rear end wall 21. The end walls 20, 21 support two ball bearings 22, 23 by which the rotor 16 is rotatively journalled. In the rear end wall 21 there is provided two air inlet openings 25, 26 for feeding pressure air into the cylinder 17 to thereby rotate the rotor 16. The cylinder 17 comprises an exhaust air outlet opening 30 communicating with the exhaust air outlet passage 12 in the housing 10, whereby exhaust air is communicated from the cylinder 17 to the atmosphere.

The illustrated power wrench is of a conventional type and comprises a forward end with an angle drive and an output shaft 27 coupled to the motor 13 via a non-illustrated transmission The rear end of the power wrench comprises a pressure air conduit connection 33 and a pressure air supply passage 28 controlled by a throttle valve 29 operated by a handle 31. Since the power wrench is of a conventional well known type it is not described in further detail.

The motor unit comprises a voltage dependent device in the form an R F (Radio Frequency) wireless transmitter/receiver 32 by which data concerning motor conditions such as operation time or operation cycles are sent to a remotely located process monitoring and/or controlling unit 42. In order to supply the R F transmitter 32 with electric voltage the motor unit is provided a voltage generating means 34 in the form of a tongue shaped piezo-electric element 35 which is arranged to generate an electric voltage upon repeated bending movements. The piezo-electric element 35 is located immediate outside the outlet opening 30 of the cylinder 17 and extends in the axial direction of the cylinder 17. The element 35 is rigidly mounted at one end on the rear end wall 21 by a clamp 36 secured by two screws 37, 38 to the end wall 21, whereas the opposite end of the element 35 is free to swing. The clamp 36 is preferably made of an electrically non-conducting material, and an electrically isolating plate 40 is located between the element 34 and the end wall 21 to avoid the generated alternating current from spreading from the piezo-electric element 35 to the housing 10 and the motor unit.

Figure 2:
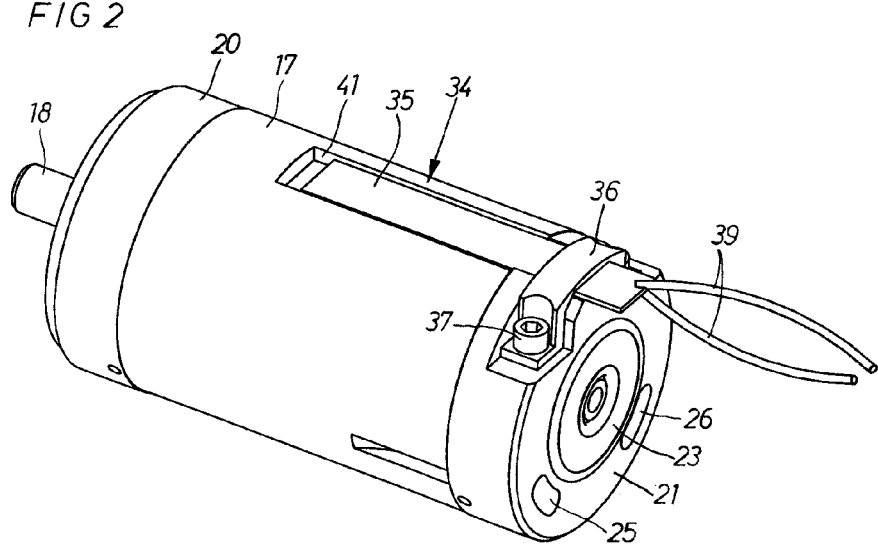
FIG. 2 shows a perspective view of a motor unit according to the invention.
Figure 3:
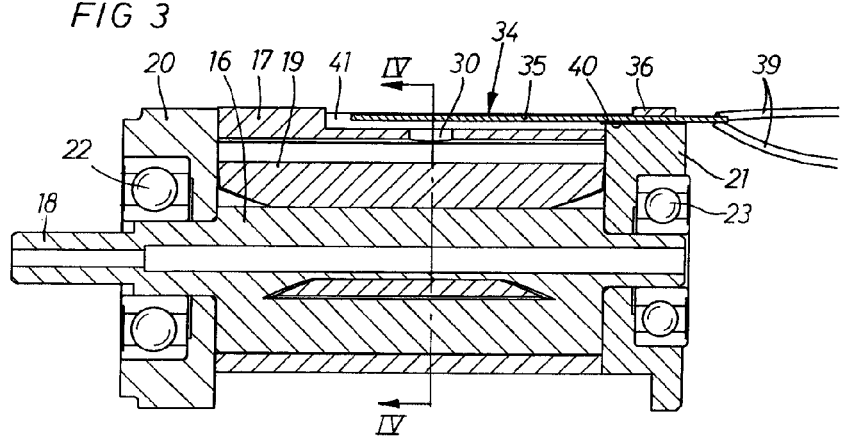
FIG. 3 shows a longitudinal section through the motor unit in FIG. 2.
Figure 4:
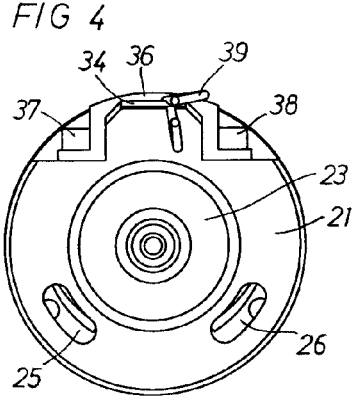
FIG. 4 shows a rear end view of the motor unit in FIG. 1.
Figure 5:
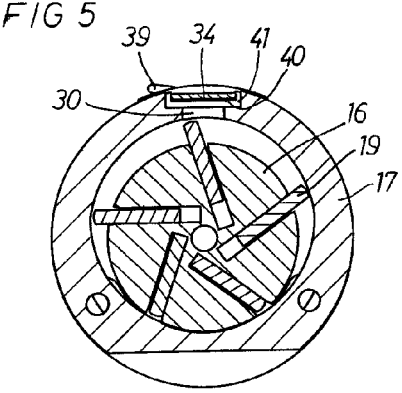
FIG. 5 shows a cross section along line IV-IV in FIG. 3.

Typical for vane motors is their pulsating exhaust air flow leaving the cylinder via the exhaust opening. The pressure pulses of the exhaust air flow are used to activate the tongue shaped element 35 in a swinging movement to thereby make the latter generate an electric voltage. In order to create a movement space for the tongue shaped element 35 there is provided a channel 41 on the outside of the cylinder 17, wherein the element 35 is arranged to be swung in both directions in relation to a central rest position. This rest position is illustrated in FIGS. 2 and 5. The channel 41 has a relatively close fit around the tongue shaped element 35 which will have an amplifying effect of the pressure pulses in their activation of the tongue shaped element 35.

The two-way swinging movement of the tongue shaped element 35 relative to the rest position generates an alternating voltage in the piezo-electric material, and an electric circuitry including a couple of wires 39 is connected to the element 35 to pick up the generated voltage and deliver it to the R F transmitter/receiver 32. An electronic voltage transforming circuitry including for instance a rectifier is arranged to transform the voltage output of the piezo-electric tongue shaped element 35 to a voltage characteristic suitable for the R F transmitter/receiver 32.

Since the number of exhaust air pressure pulses generated per rotor revolution is directly dependent on the number of vanes 19 carried on the rotor 16 it is possible to calculate the rotation speed of the motor in terms of rotor revolutions per time unit as multiples of the number of pulses per time unit. By using the gearing ratio of the power transmission between the motor rotor and the output shaft in combination with the number of generated pressure pulses it is also possible to calculate the rotational angle covered by the rotor and hence the rotational angle covered by the output shaft. This is most useful in power wrenches wherein screw joint tightening processes could be accurately controlled.

In some motor unit applications like pneumatic power wrenches there may be used torque sensors and/or angle sensing means, perhaps in combination with wireless signal transmitting means. In many cases a two-way communication of data is needed not only to retrieve data from the motor unit but to transfer operation related data from a stationary operation control unit to the motor unit so as to control the working process of the power wrench.

The above described embodiment of the invention is described in connection with a pneumatic power wrench, but the invention is not at all restricted that application. For instance, a motor unit according to the invention may very well be used in process industry where installation of electric cables for connection of the motor unit to process monitoring and/or controlling means is not desirable and instead an R F communication is preferred. Neither is the invention restricted to the very location of the piezo-electric element described above. Although the pressure pulses of the exhaust air flow are strongest immediately outside the outlet opening in the cylinder other locations in the outlet passage may be used for the piezo-electric element. Also arrangements of the piezo-electric element other than the attachment to the cylinder end wall may be used.

The invention claimed is:

1. A pneumatic motor unit comprising:
a housing;
a rotation motor which generates a pulsating exhaust air outlet flow;
a pressure air inlet passage;
an exhaust air outlet passage;
a voltage depending device which communicates signals in response to at least one of an actual motor condition and operation parameter values; and
a voltage generating section connected to said voltage depending device;
wherein said voltage generating section comprises a piezo-electric element which is provided in the exhaust air outlet passage and which is arranged to be exposed to pressure pulses of the pulsating exhaust air outlet flow from the motor to thereby generate an electric voltage, and an electric circuitry which is connected to said piezoelectric element and which communicates said electric voltage to said voltage depending device.

2. The motor unit according to claim 1, wherein said piezoelectric element is tongue-shaped and elastically bendable, and has one end which is secured to the motor and an opposite free end which is movable, said tongue-shaped piezoelectric element being activated by the pressure pulses to swing in opposite directions from a central rest position to thereby generate an alternating current voltage.

3. The motor unit according to claim 2, wherein:
the rotation motor comprises a vane motor with a rotor, a cylinder, and two opposite end walls, said cylinder having at least one exhaust air outlet opening; and
said piezoelectric element is provided right opposite one of said at least one exhaust air outlet opening.

4. The motor unit according to claim 1, wherein:
the rotation motor comprises a vane motor with a rotor, a cylinder, and two opposite end walls, said cylinder having at least one exhaust air outlet opening; and
said piezoelectric element is provided right opposite one of said at least one exhaust air outlet opening.

5. The motor unit according to claim 1, wherein:
the pressure pulses of the exhaust air outlet flow are directly related to a rotational movement of a rotor of the motor; and
an alternating current voltage generated by said piezoelectric element has a frequency corresponding to a frequency of the pressure pulses and, accordingly, to the rotational movement of the motor rotor.

6. The motor unit according to claim 5, wherein an electronic operation monitoring unit is arranged to calculate a rotational angle covered by the motor rotor, based on a number of the pressure pulses of the exhaust air outlet flow and subsequent voltage alterations.

7. The motor unit according to claim 6, wherein:
the rotation motor generates a certain number of pressure pulses per rotor revolution; and
the electronic operation monitoring unit is arranged to further calculate a rotor speed in terms of a number of revolutions per time unit by counting multiples of said certain number of pressure pulses for each time unit.

8. The motor unit according to claim 5, wherein:
the rotation motor generates a certain number of pressure pulses per rotor revolution; and
an electronic operation monitoring unit is arranged to calculate a rotor speed in terms of a number of revolutions per time unit by counting multiples of said certain number of pressure pulses for each time unit.

\* \* \* \* \*